United States Patent [19]
Mudra et al.

[11] Patent Number: 5,949,493
[45] Date of Patent: Sep. 7, 1999

[54] TELEVISION RECEIVER WITH EXTERNAL ACCESS

[75] Inventors: Robert E. Mudra, Glenview; Nick Shaw, Glendale Heights, both of Ill.

[73] Assignee: Zenith Electronics Corporation, Glenview, Ill.

[21] Appl. No.: 08/781,759

[22] Filed: Jan. 10, 1997

[51] Int. Cl.⁶ .................................................. H04N 5/44
[52] U.S. Cl. .................. 348/553; 348/787; 348/789; 348/836; 361/752
[58] Field of Search .................... 348/705, 706, 348/789, 825, 826, 836, 843, 839, 553, 787; 361/752, 727, 724, 759; 439/55, 65, 74; H04N 5/44

[56] References Cited

U.S. PATENT DOCUMENTS

| | | | |
|---|---|---|---|
| D. 377,013 | 12/1996 | Mori et al. ............................. | D14/129 |
| 3,572,865 | 3/1971 | Attardi ..................................... | 312/7 |
| 3,622,700 | 11/1971 | Goetz ....................................... | 348/839 |
| 3,758,716 | 9/1973 | James et al. ............................. | 348/839 |
| 4,048,669 | 9/1977 | Bowler et al. .......................... | 361/391 |
| 4,646,157 | 2/1987 | Wakai et al. ............................ | 358/236 |
| 4,716,493 | 12/1987 | Zelkowitz ................................ | 361/383 |
| 4,869,680 | 9/1989 | Yamamoto et al. .................... | 439/327 |
| 4,914,552 | 4/1990 | Keemer .................................... | 361/415 |
| 5,036,428 | 7/1991 | Brownhill et al. ...................... | 361/386 |
| 5,396,401 | 3/1995 | Nemoz ..................................... | 361/690 |
| 5,402,319 | 3/1995 | Shumaker et al. ...................... | 361/796 |
| 5,592,234 | 1/1997 | Gardner et al. ......................... | 348/553 |
| 5,760,848 | 6/1998 | Cho .......................................... | 358/254 |

*Primary Examiner*—John K. Peng
*Assistant Examiner*—Linus H. Lo

[57] ABSTRACT

A television receiver includes a removable panel that physically supports an integrated circuit board that provides for external control of certain of the receiver functions. A telephone jack and an antenna jack are secured to the removable panel for enabling external access. The television receiver has a separate communications microprocessor that communicates with the master microprocessor controller and a power supply that provides low voltage power for external use.

5 Claims, 2 Drawing Sheets

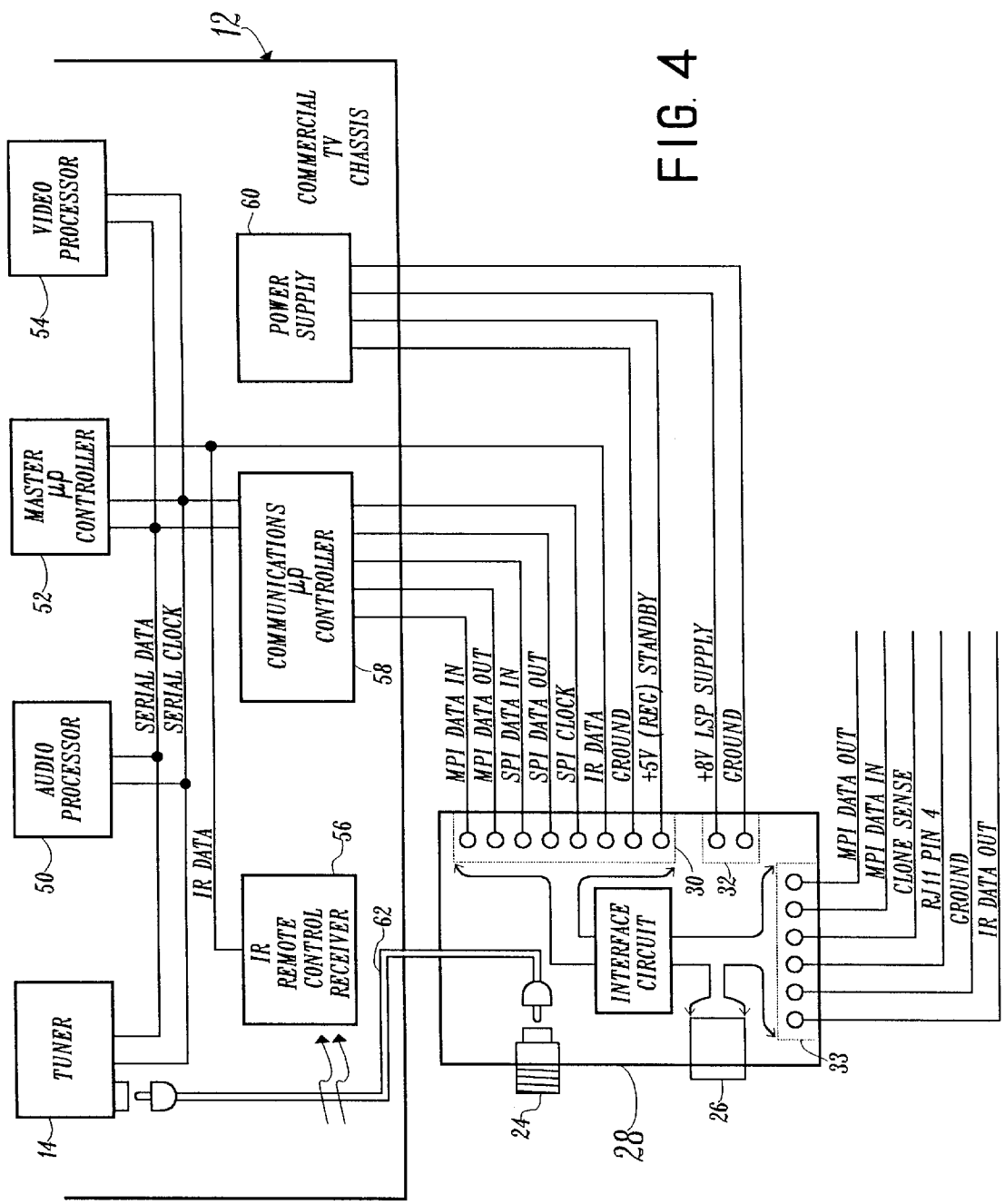

TELEVISION RECEIVER WITH EXTERNAL ACCESS

BACKGROUND OF THE INVENTION AND PRIOR ART

This invention relates generally to television receivers and specifically to commercial television receivers such as those dedicated to hotel/motel, educational and hospital service, all referred to as institutional service.

In an institutional environment, the television receiver is usually centrally controlled to regulate the types of programs that are receivable, restrict "pay per view" special programming and convey a menu of in-house services. In such an environment, the user may prefer to install specialty equipment and services that may only use selected functions of the television receiver. These services usually require an external power supply and the opening up (removal of the back) of the television receiver housing to permit installation of accessory circuit boards and the like.

The invention provides a convenient arrangement for enabling the user to communicate with selected portions of the television receiver and to add an accessory circuit board, all without requiring removal of the cabinet back of the television receiver, physical access to the receiver circuitry or an external power supply.

OBJECTS OF THE INVENTION

A principal object of the invention is to provide a novel television receiver with external access.

A further object of the invention is to provide a television receiver that does not require removal of the cabinet back to provide external access and which provides accessory operating power.

Another object of the invention is to provide a novel television receiver having a removable panel and connecting means for mechanically and electrically supporting an accessory board for interacting with selected functions and circuitry of the television receiver.

BRIEF DESCRIPTION OF THE DRAWING

These and other objects and advantages of the invention will be apparent upon reading the following description thereof in conjunction with the drawings, in which:

FIG. 4 illustrates the functional interrelationship between the circuit board and the functional blocks of the television receiver.

DESCRIPTION OF THE PREFERRED EMBODIMENT

Figure 1:
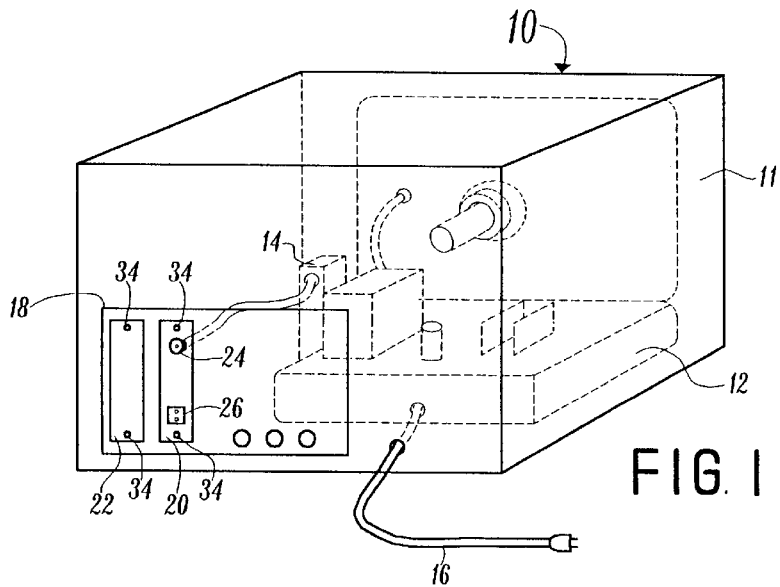
FIG. 1 is a rear perspective view of a television receiver constructed in accordance with the invention.

Referring to FIG. 1, a television receiver includes a cabinet or housing 10, in which a cathode ray tube 11 and a television receiver chassis 12, having a tuner 14, are generally illustrated as dotted lines. The receiver is connectable to a conventional source of alternating current power by means of a line cord 16. A special area 18 of the back of the receiver housing 10 supports a pair of removable panels 20 and 22. Panel 22 is blank, whereas panel 20 includes an antenna jack 24 and an RJ11 type jack 26 for permitting a degree of external access to selected functions of the television receiver. The panels are secured to housing 10 by means of screws 34.

Figure 2:
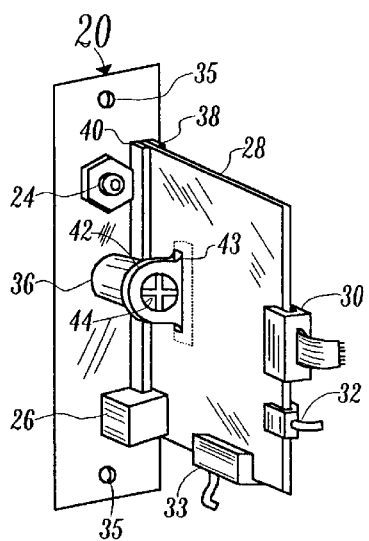
FIG. 2 is a rear perspective view of a removable panel supporting the circuit board used in the invention.
Figure 3:
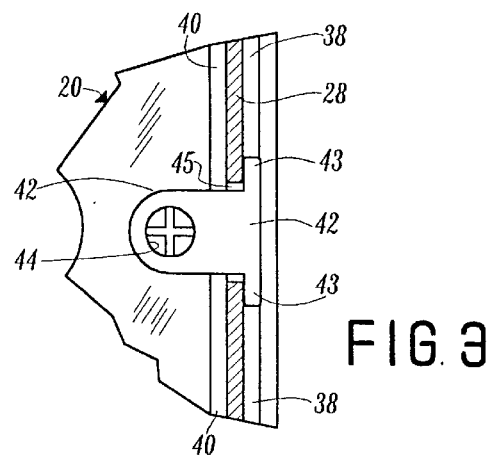
FIG. 3 is an enlarged sectional view showing the manner of attachment of the circuit board to the removable panel.

FIG. 2 shows the rear of removable panel 20 and antenna jack 24 and jack 26, which is preferably mounted on a circuit board 28. Panel 20 includes a pair of mounting holes 35 through which mounting screws 34 pass when the panel is installed on the housing 10. A mounting post 36 is integrally formed with the removable panel, the entire structure being preferably molded of suitable plastic. A pair of molded parallel rails 38 and 40 establish a channel or groove between them for supporting the edge of circuit board 28. When installed, circuit board 28 is thus supported in a vertical position. Circuit board 28 will be understood to include appropriate components and interface circuitry (neither of which are shown) for enabling external access to selected circuits and control of selected functions of the television receiver, as will be more fully described. A number of connectors 30, 32 and 33 (FIG. 4) contact suitable terminals (not shown) for completing electrical connections via cables to the television receiver chassis. Circuit board 28 is locked in position and secured to support post 36 by means of a fastener plate 42 and a screw 44, as best seen in FIG. 3. Fastener plate 42 has a pair of flanges 43 that extend beyond the edges of an elongated cutout 45 that is formed in circuit board 28. The combined action of the edge of circuit board 28 being confined between parallel rails 38 and 40 and the attachment of fastener plate 42 to support post 36 by screw 44, enables circuit board 28 to be securely supported and locked to the removable panel. Panel 22 that is blank includes parallel rails and a support post to enable support of an externally supplied circuit board.

In FIG. 4, the television receiver chassis 12 includes tuner 14, an audio processor 50, a master microprocessor controller 52, a video processor 54, an IR remote control receiver 56, a communications microprocessor controller 58 and a power supply 60. Serial data and serial clock lines interconnect the functional blocks of the receiver. The circuit board connectors 30, 32 and 33, as indicated, are connected with various portions to the television receiver chassis. An MPI (multiple protocol interface) data-in and an MPI data-out line are connected to communications controller 58. Similarly SPI (serial peripheral interface) data-in, data-out and clock lines are connected to communications controller 58. An IR data line is connected to the IR output of IR remote control receiver 56, which enables the IR remote control receiver to be used to receive IR remote control signal codes and supply them to the user via the circuit board 28 and jack 26. A +8.0 volt LSP (local service provider) voltage supply and ground are made available at connector 32 for use by the LSP. A +5.0 volt regulated voltage and ground, for operating the circuit board 28, are supplied from power supply 60. Data and communications are available at jack 26.

The communications microprocessor controller 58 supports both the MPI and SPI formats. The MPI format is a 1200 baud, half duplex, two wire synchronous interface similar to RS 232. The SPI is a three wire asynchronous, full duplex interface operating at approximately 10k baud. The IR data line allows the LSP to use a remote control that is different from the one provided with the television receiver while still using the remote control receiver in the television receiver.

A phono type connector and cable 62 is provided between antenna jack 24 and tuner 14. This permits the LSP to insert proprietary RF hardware between the cable system and the television tuner to perform two-way communication with the headend equipment. As mentioned, the provision of the LSP power supply voltages obviates the need for the LSP to supply a wall mounted or other type power supply. Also, the provision for housing an accessory card containing the LSP circuitry on the removable panel 22, means that the LSP need not supply a housing for his product. Finally, access to the necessary internal television signals, communications capability with the master controller of the receiver and a ready power supply, enables the LSP to install his accessory card in the television receiver without removing the cabinet back.

Circuit board 28 may be removed and replaced with a proprietary LSP circuit board. Connectors 30, 32 and 33 are provided with cables of sufficient length to enable circuit board 28 to be removed (and replaced) without necessitating removal of the back of the television receiver. The leads on connector 33 make it possible for the LSP to connect internally (as he would to the RJ11 external jack) under appropriate circumstances. Also, if connector 30 is removed, the LSP may reconfigure the RJ11 for his new equipment.

What has been described is a novel television receiver having the capability of providing external access to certain functions of a television receiver without the need to remove the cabinet back. It is recognized that numerous changes in the described embodiment of the invention will occur to those skilled in the art without departing from its true spirit and scope. The invention is to be limited only as defined in the claims.

What is claimed is:

1. A television receiver comprising:

a housing;

a small removable panel in a wall of said housing;

an interface circuit board;

a long slot in said small removable panel for receiving an edge of said interface circuit board;

a support post on said small removable panel, said small removable panel, said long slot and said support post comprising a single piece of molded plastic;

a cutout in said interface circuit board;

a fastener adapted to engage said interface circuit board through said cutout when said interface circuit board is installed in said slot;

means for securing said fastener to said support post;

connector means for interconnecting said interface circuit board with selected circuits in said television receiver; and a jack mounted on said small removable panel and interconnected with said interface circuit board.

2. The television receiver of claim 1, wherein said jack comprises an RJ11 jack, and further including:

an antenna jack on said removable panel; and a cable interconnecting said antenna jack to the tuner in said television receiver.

3. The television receiver of claim 2, further including:

a second removable panel having a slot and a support post for supporting an accessory board for interconnection with said television receiver.

4. The television receiver of claim 3, further including:

a master controller;

a power supply;

a communications microprocessor interconnecting said master controller and said jack; and cable means for supplying power from said power supply to said interface circuit board and to said jack.

5. The television receiver of claim 4, further including:

a remote control receiver coupled to said master controller; and means for providing the output of said remote control receiver to said jack.

* * * * *